UNITED STATES PATENT OFFICE.

HERMANN SCHRADER, OF HÖNNINGEN, GERMANY.

PROCESS OF MORDANTING WOOL, &c.

SPECIFICATION forming part of Letters Patent No. 735,599, dated August 4, 1903.

Application filed March 19, 1903. Serial No. 148,520. (No specimens.)

*To all whom it may concern:*

Be it known that I, HERMANN SCHRADER, doctor of philosophy, a subject of the King of Prussia, German Emperor, residing at Hönningen-on-the-Rhine, Rhine Province, Kingdom of Prussia, German Empire, have invented new and useful Improvements in Processes of Mordanting and Dyeing Wool and Fabrics Made of Wool, of which the following is a specfication.

This invention relates to the process of mordanting wool by means of metallic compounds, and has for its object to render the process more expeditious and considerably cheaper.

I have found that the fixation of the metallic mordants may be effected in a very excellent manner by treating the wool with metallic mordants and the organic acids that may be obtained from the vinasse in the following manner: The vinasse—*i. e.*, the residual liquor remaining in the molasses of beet-root, &c., by separating the sugar by fermentation or desaccharifying with barium oxid, strontium oxid, or calcium oxid—is concentrated to a specific weight of 1.4. It is mixed in a warm condition with the quantity of sulfuric acid necessary for neutralizing the alkalinity. The sulfate of potassium formed by this treatment is separated from the liquid by cooling, crystallizing, &c. The sulfuric acid, present in the liquid as in a combined as in a free state, is precipitated by a suitable barium compound, for instance carbonate of barium. The liquor separated from the sulfate contains the organic acids of the vinasse.

The said organic acids may be used either in the state in which it is obtained by the described process forming the subject of the application for Letters Patent, bearing the Serial No. 114,008, dated July 1, 1902, or after having been purified by a filtration or digestion with vegetable or animal carbon. The liquor obtained directly by my process will have the specific gravity of about 1.2 to 1.3 and will contain about forty per cent. acids of the molecular weight 135, whereas the liquor after having been digested with carbon will have a specific gravity of about 1.1 to 1.2 and will contain about twenty-four per cent. acids of the molecular weight 135. I shall call the liquor "the organic acids of the vinasse." The composition of said organic acids corresponds to the formula

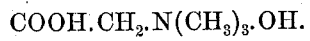

$$COOH.CH_2.N(CH_3)_3.OH.$$

The said liquors containing the organic acids of the vinasse are used for mordanting and dyeing wool according to my invention in combination with metallic mordants.

One hundred kilograms wool are placed in a bath containing three thousand five hundred liters water, 4.5 kilograms of the acid-of-molasses residue, and 1.5 potassium bichromate. It is boiled in this bath for one hour and a half and then rinsed in cold water and centrifugated. The material is then placed in a wet condition in an acid-bath which contains, say, two thousand liters water, two kilograms alizarin cyanin R R in powdered state, and three kilograms acetic acid and boiled therein for 5/4 hours. The bath must then appear of clear color. The material is then washed in cold water, centrifugated, and finally dried.

I may dye wool by using other dyestuffs with metallic mordants and the acids of the vinasse in a similar way. I may use, for instance, two per cent. chromate of potassium, 1.5 per cent. organic acids of the vinasse, and ten per cent. alizarin-blue S. W. I may also use natural organic dyestuffs. For instance, I may produce a black shade on wool by using two per cent. chromate of potassium, 1.5 per cent. organic acids of the vinasse, and fifteen per cent. logwood extract.

The amount of the dyestuff, the metallic mordants, the organic acids of the vinasse, the concentration, and the temperature of the treatment will be found by the skilled workman by experiment. It may be, for instance, suitable in many cases to use a higher amount of the organic acids of the vinasse—for instance, 7.5 per cent.

The metallic mordants suitable in any case may vary, according to the nature of the dyestuffs used. I may, for instance, use alum, salts of aluminum, salts of iron, as sulfate of iron, acetate of iron, salts of copper, as sulfate of copper, or salts of tin. The skilled workman will find the metallic mordants suitable for his purposes by experiment. One may also use mixtures of the metallic mordants. I may also use the vinasse and an addition of sulfuric acid in combination with metallic mordants.

What I claim as my invention, and desire to secure by Letters Patent, is—

1. The process of mordanting and dyeing wool consisting in treating the wool with a combination of metallic mordants and the organic acids of the vinasse having the composition $COOH.CH_2.N(CH_3)_3.OH$.

2. The process of mordanting and dyeing wool consisting in treating the wool with a combination of compounds of chromium and the organic acids of the vinasse having the composition $COOH.CH_2.N(CH_3)_3.OH$.

In witness whereof I have hereunto signed my name, this 5th day of March, 1903, in the presence of two subscribing witnesses.

HERMANN SCHRADER.

Witnesses:
W. FRHRR. VON LYNCKER,
CARL SCHMITT.